US011421821B2

(12) United States Patent
Klegin et al.

(10) Patent No.: US 11,421,821 B2
(45) Date of Patent: Aug. 23, 2022

(54) MULTI-PURPOSE TV MOUNTING SYSTEM

(71) Applicant: TOON-INDUSTRIES, INC., White Bear Lake, MN (US)

(72) Inventors: Timothy Thomas Klegin, White Bear Lake, MN (US); Gregory Alan Kvidera, Webster, WI (US)

(73) Assignee: TOON-INDUSTRIES, INC., White Bear Lake, MN (US)

( * ) Notice: Subject to any disclaimer, the term of this patent is extended or adjusted under 35 U.S.C. 154(b) by 0 days.

(21) Appl. No.: 17/200,635

(22) Filed: Mar. 12, 2021

(65) Prior Publication Data

US 2021/0301975 A1    Sep. 30, 2021

Related U.S. Application Data

(60) Provisional application No. 63/003,204, filed on Mar. 31, 2020.

(51) Int. Cl.
*F16B 1/00* (2006.01)
*F16M 13/02* (2006.01)
*F16B 2/06* (2006.01)

(52) U.S. Cl.
CPC .......... *F16M 13/022* (2013.01); *F16B 2/065* (2013.01)

(58) Field of Classification Search
CPC .............................. F16M 13/022; F16B 2/065

USPC ... 248/230.1, 229.1, 226.11, 227.4, 917, 919
See application file for complete search history.

(56) References Cited

U.S. PATENT DOCUMENTS

| | | | | |
|---|---|---|---|---|
| 7,562,855 | B2 * | 7/2009 | Oetlinger | F16B 7/0493 |
| | | | | 600/234 |
| 7,611,110 | B2 * | 11/2009 | Franchini | F16M 11/24 |
| | | | | 248/230.1 |
| 7,726,617 | B2 | 6/2010 | Zambelli et al. | |
| 8,820,543 | B2 * | 9/2014 | Huang | F16B 2/246 |
| | | | | 248/230.4 |
| 9,179,775 | B2 | 11/2015 | Chen | |
| 9,420,886 | B2 * | 8/2016 | Whalen | F16M 11/08 |
| 11,197,737 | B2 * | 12/2021 | Stefan | A61B 90/57 |
| 2020/0307814 | A1 * | 10/2020 | Peng | F16B 2/065 |
| 2021/0408662 | A1 * | 12/2021 | Yoo | F16B 2/06 |

* cited by examiner

*Primary Examiner* — Todd M Epps (74) *Attorney, Agent, or Firm* — Edlavitch Law PLLC (57) ABSTRACT

Described herein are improved multi-purpose television mounting systems, methods, and apparatuses. Embodiments can include a clamp having a clamp rail and a clam base that can be arranged in different ways so that a TV mounting system using the clamp can mount a TV to many different types of objects for use indoors or outdoors.

20 Claims, 7 Drawing Sheets

MULTI-PURPOSE TV MOUNTING SYSTEM

CROSS-REFERENCE TO RELATED APPLICATIONS

The present application claims priority to Prov. U.S. Pat. App. Ser. No. 63/003,204, filed Mar. 31, 2020 and entitled "MULTI-PURPOSE TV MOUNTING SYSTEM THAT IS REMOVABLE, DOES NOT REQUIRE DRILLING, AND WON'T DAMAGE THE MOUNTING SURFACE", the entire disclosure of which application is hereby incorporated herein by reference.

TECHNICAL FIELD

The present disclosure relates to multi-purpose television mounting systems.

BACKGROUND

Many people want to have a TV on their deck that is easy to use, does not damage the mounted surface yet is removable and provides various viewing angles. These decks could be at apartments, homes, restaurants, and watercraft such as pontoons. Unfortunately, typical TV mounts require drilling holes and permanently damaging the mounted surface. Many people who rent property like apartments or homes that have a deck and want to watch TV outside are limited to having the TV sitting on a table or precariously on the deck railing. If they did want to mount a television, they would have to drill holes damaging the mounted surface. Also, decks can have different header boards. Also, there are several products on the market for watercraft to mount a TV screen. Many require drilling of holes and a permanently mount or bracket. Therefore, there is a need for a device that allows people the ability to watch TV outside without having to worry about damaging the surface the TV is mounted to, is easy to install, easy to un-install, easy to store and durable.

SUMMARY

Described herein are improved multi-purpose television mounting systems, methods, and apparatuses. Embodiments can include a clamp having a clamp rail and a clamp base that can be arranged in different ways so that a TV mounting system using the clamp can mount a TV to many different types of objects for use indoors or outdoors.

Some embodiments can include a clamp for a television mounting system that can include a clamp rail, a clamp base, and a clamp underpart. In some embodiments, the clamp does not include the clamp underpart. The clamp rail can include two lateral walls extending out from opposing long ends of a base wall to form a receptacle. The two lateral walls are parallel to each other and the base wall is perpendicular to the two lateral walls. The clamp base can include an interface wall that is configured to attach to one of the lateral walls or the base wall. The clamp base can also include a body that has a pole hole configured to receive a pole. As mentioned, the clamp can include a clamp underpart. The clamp underpart can be configured to secure the clamp to an object received by the receptacle when a tightening screw of the clamp underpart is turned clockwise. In embodiments without the clamp underpart, the clamp can be tightened by a tightening screw interacting with the rail.

In some embodiments, a system for mounting a flat panel monitor, television, or other type of display can include a pole, a display mounting plate, a plate base, a clamp with a rail and a base, and tightening screws. The plate base can be attachable to the display mounting plate and can include a body having a pole hole configured to receive the pole as well as a tightening screw configured to secure the pole received by the pole hole of the body of the plate base when the tightening screw of the plate base is turned clockwise. The clamp can include a clamp rail having two lateral walls extending out from opposing long ends of a base wall to form a receptacle. The two lateral walls can be parallel to each other and the base wall is perpendicular to the two lateral walls. The clamp can also include a clamp base having an interface wall that is configured to attach to one of the lateral walls or the base wall as well as a body having a pole hole configured to receive the pole. The clamp can also include hand knob tightening screws configured to secure the clamp to an object received by the receptacle when the hand knob tightening screws are received by corresponding threaded holes of the clamp and turned clockwise.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Described herein is a multi-purpose TV mounting system as well as parts and methods that can be used by the system that can be used in various applications such as house decks with vertical or horizontal header boards, wood structures with edges, and pontoon boats with various size deck railings of various sizes. Embodiments described herein can be "easy on and easy off" with a quick release mechanism that does not require drilling. Additionally, the embodiments can be used where the TV is mounted "top down" or "bottom-up" based on the needs of the end user.

Since many decks have different header boards, embodiments can be designed for nearly all horizontal deck boards as well as header boards that are vertical. There are several products on the market for watercraft to mount a TV screen. Many require drilling of holes and a permanently mount and bracket. Some embodiments described herein do have such requirements and yet are sturdy and can be left in place for an extended period of time then removed quickly if needed or if the desire is to use in another location. In general, embodiments relate to novel TV mounting systems that are removable and that do not damage the mounted surface. For instance, some embodiments allow for quickly mounting and/or unmounting aspects of the embodiments to various rail structures. Thus, at least the embodiments described herein and other embodiments can provide a solution that allows people the ability to watch TV outside or inside without having to worry about damaging the surface the TV is mounted to, is easy to install, easy to un-install, easy to store and durable.

Figure 1:
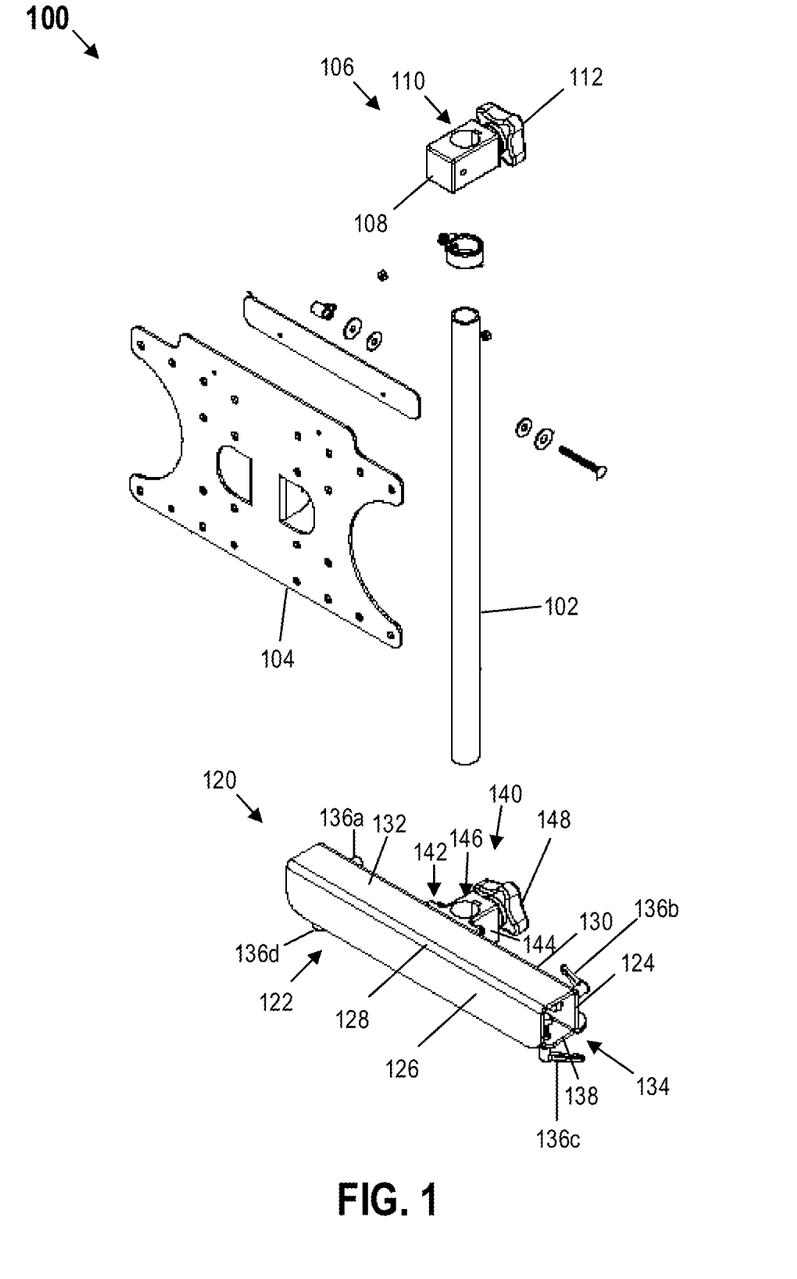
FIG. 1 illustrates a partially exploded view of a system for mounting a flat panel monitor, television, or other type of display, in accordance with some embodiments of the present disclosure.
Figure 2:
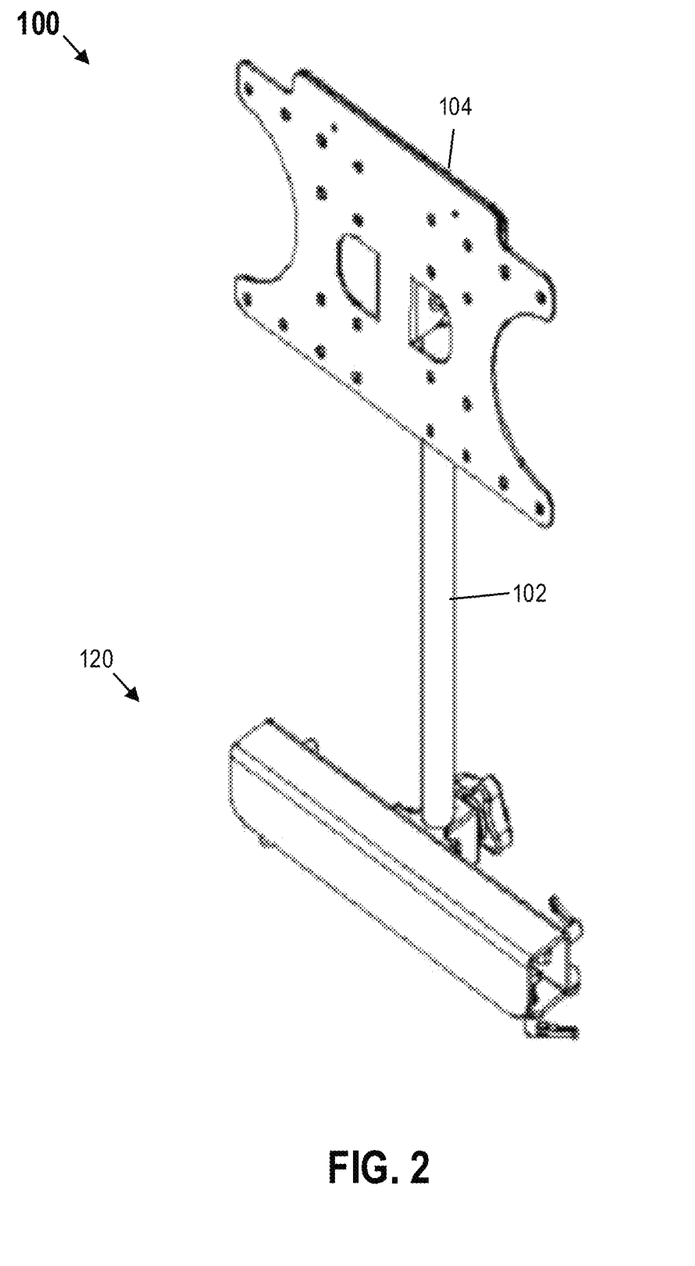
FIG. 2 illustrates a perspective view of the system shown in FIG. 1, in accordance with some embodiments of the present disclosure.
Figure 3:
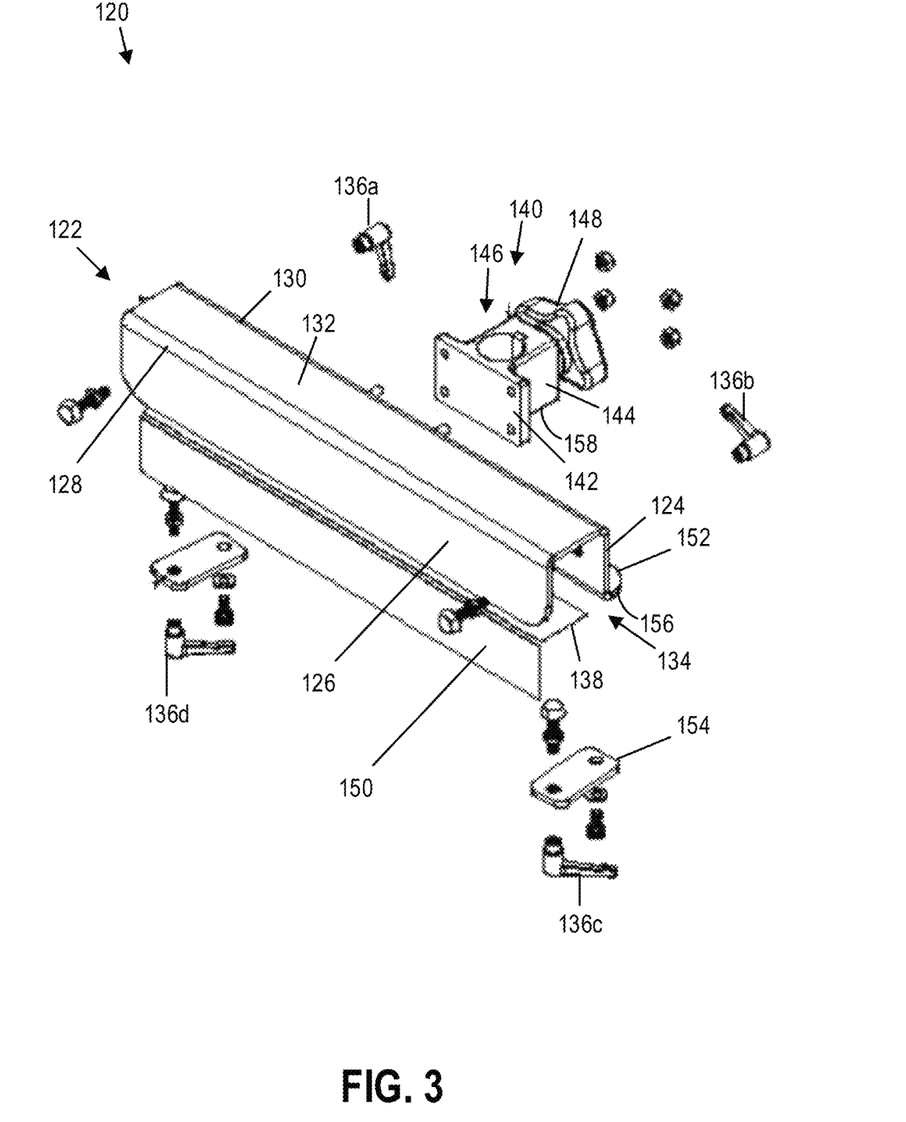
FIG. 3 illustrates a partially exploded view of a clamp of the system shown in FIG. 1, in accordance with some embodiments of the present disclosure.

In some embodiments, such as shown in some of the figures, an assembly of some of the embodiments can be used for pontoon rail applications (e.g., see FIGS. 1 to 3). Such an assembly allows a clamp of the system to rest on the top and two sides of the rail. Within the clamp there can be foam surfaces or other types of soft material surface, such as including rubber or felt, so there is no metal to metal contact. There are also adjustable clamping screws shown. There can be four of these tightening mechanisms that are used to clamp down on the two sides of the rail and underneath providing a secured four surface hold onto the rail. The mechanisms can include ratchet-like handles, thumb screws, and knobs to remove the clamp from a rail manually. As describe herein, there are many alternatives that can be used by embodiments for the aforesaid tightening mechanisms.

Figure 8:
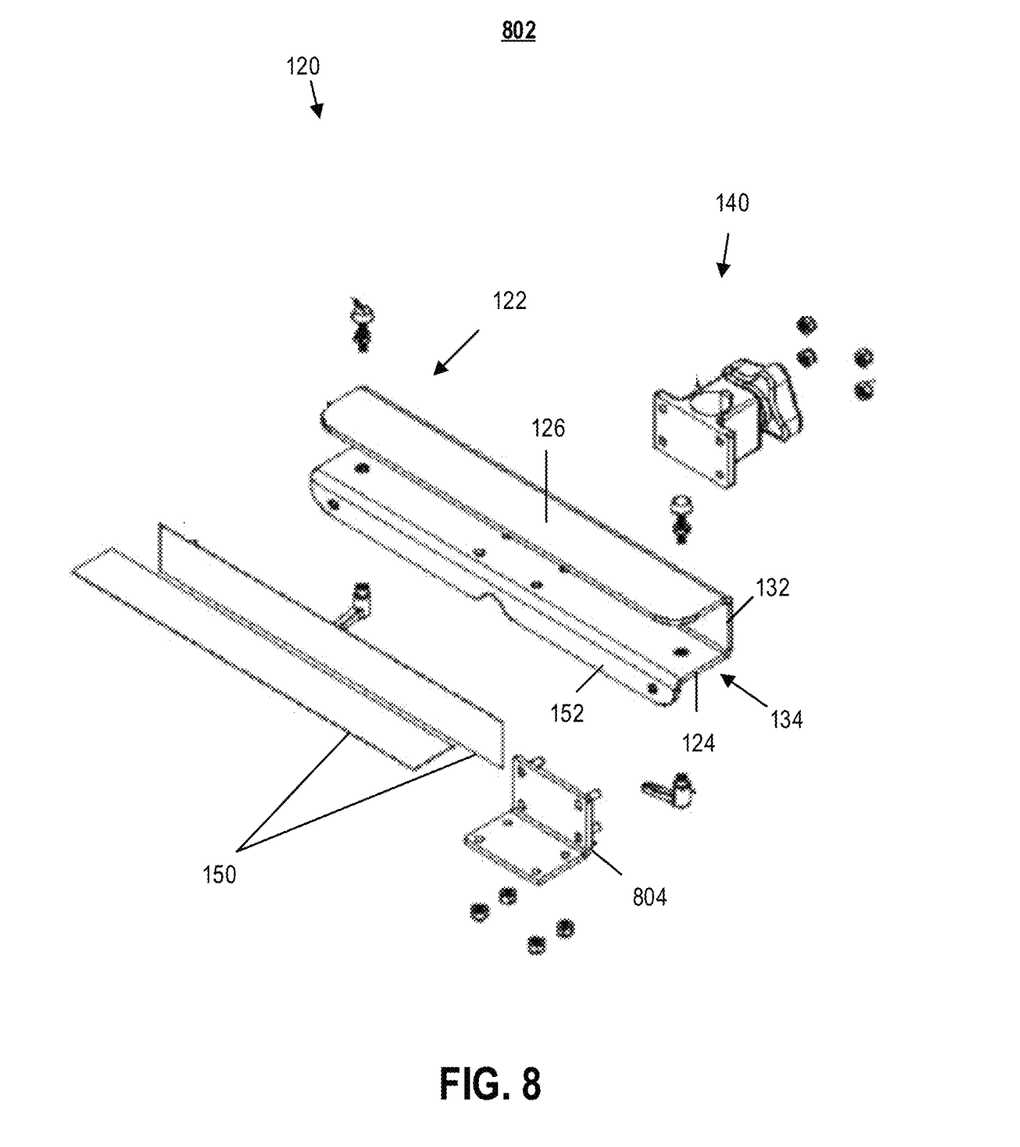
FIGS. 8 and 9 illustrate a perspective view and a partially exploded view, respectively, of another example arrangement of the clamp shown in FIG. 3, in accordance with some embodiments of the present disclosure.
Figure 9:
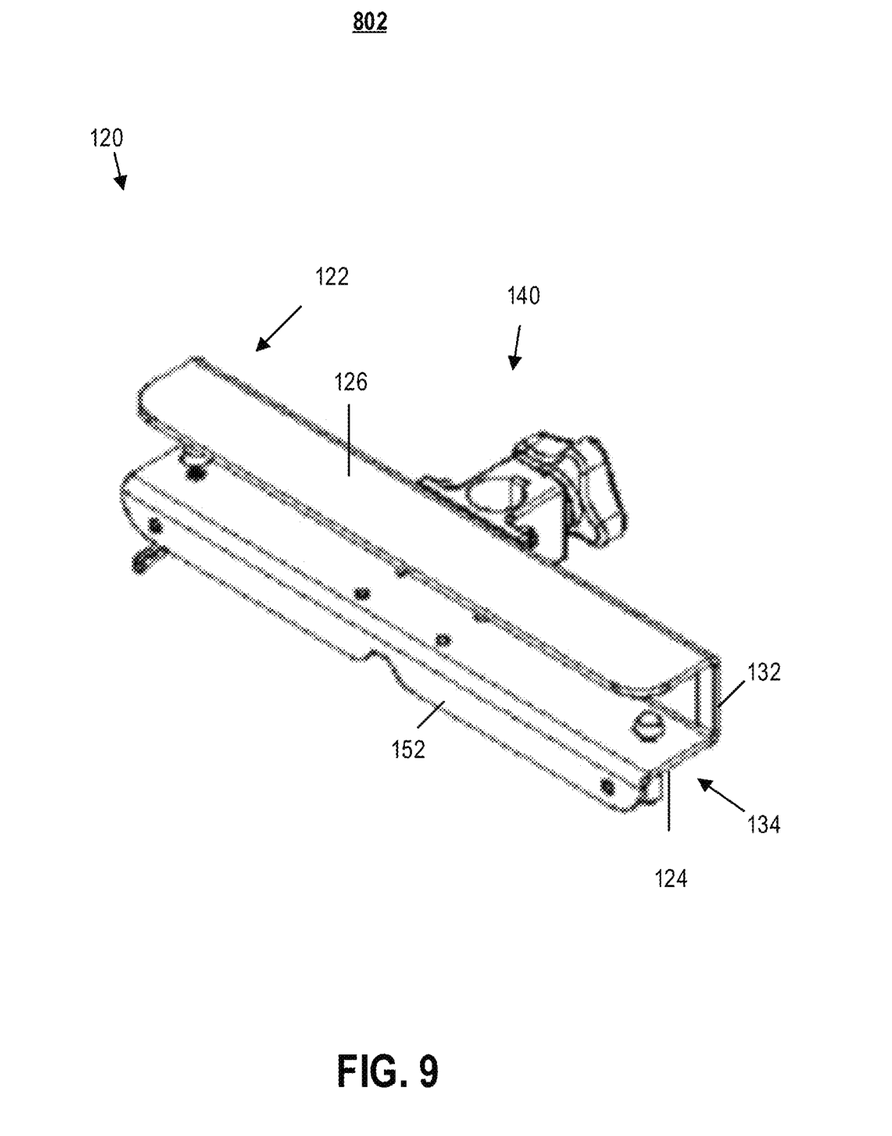

In some embodiments, the clamp can be arranged in a different way to clamp onto an object such as a rail. E.g., see FIGS. 8 to 9. FIGS. 8 to 9 show a configuration to mount the clamp to a horizontal residential or commercial deck header railing, for example. In this configuration the pressure to clamp onto the railing is from the top and bottom providing a secure mount yet continues to be easily removable if needed without damaging the mounted surface. The aforesaid arrangement of the clamp can be used to mount the system to a horizontal deck board. This arrangement allows for a secure fit onto the edge of the horizontal header board to which it is attached allowing the user to watch TV in a portable location that does not damage the surface mounted to.

In many embodiments of the system, the clamp does not damage the surface it is mounted to. The system can be installed in less than a minute in most situations without any tools. And, system can be removed from the mounted surface in less than a minute.

FIG. 1 depicts a partially exploded view of a system 100 for mounting a flat panel monitor, television, or other type of display. FIG. 2 depicts a perspective view of the system 100 shown in FIG. 1. The system 100 includes a pole 102, a display mounting plate 104, and a plate base 106 attachable to the display mounting plate 104. The plate base 106 includes a body 108 including a pole hole 110 configured to receive the pole 102. The plate base 106 also includes a tightening screw 112 configured to secure the pole 102 received by the pole hole 110 of the body 108 of the plate base 106 when the tightening screw 112 of the plate base 106 is turned clockwise.

The system shown in FIG. 1 also includes a clamp 120. The clamp 120 includes a clamp rail 122. The clamp rail 122 includes two lateral walls 124 and 126 extending out from opposing long ends 128 and 130 of a base wall 132 to form a receptacle 134. The two lateral walls 124 and 126 are parallel to each other and the base wall 132 is perpendicular to the two lateral walls 124 and 126. The clamp 120 also includes a clamp underpart 138 and a clamp base 140. The clamp base 140 includes an interface wall 142 that is configured to attach to one of the lateral walls 124 and 126 or the base wall 132. The clamp base 140 also includes a body 144 having a pole hole 146 configured to receive the pole 102. The clamp base 140 also includes hand knob tightening screws 136a, 136b, 136c, and 136d configured to secure the clamp 120 to an object received by the receptacle 134 when the hand knob tightening screws are received by corresponding threaded holes of the clamp and turned clockwise.

Figure 4:
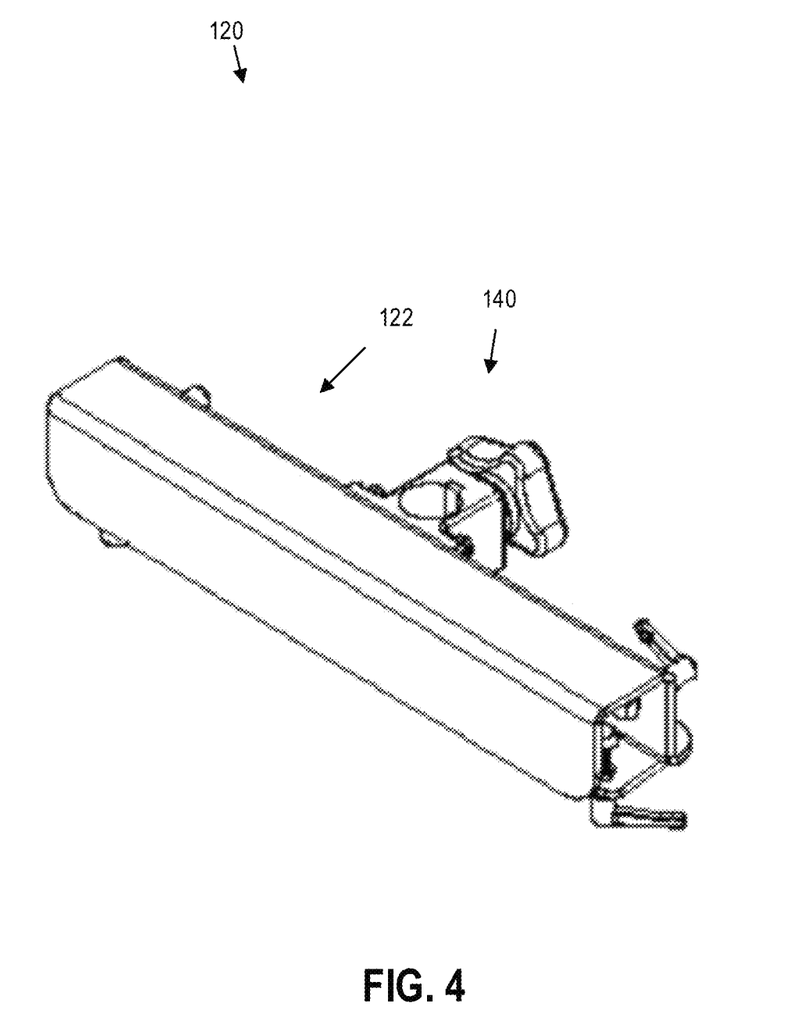
FIG. 4 illustrates a perspective view of the clamp shown in FIG. 3, in accordance with some embodiments of the present disclosure.

FIG. 3 depicts a partially exploded view of the clamp 120 shown in FIGS. 1 and 2. FIG. 4 depicts a perspective view of the clamp 120 shown in FIGS. 1 to 3. As illustrated in FIGS. 1 to 3, the clamp 120 includes a clamp underpart 138 (which can be or include a liner having a soft material such as felt), and it can be configured to secure the clamp 120 to an object received by the receptacle 134, gently, when a tightening screw of the clamp underpart (e.g., see tightening screws 136c and 136d) is turned clockwise.

Also, as shown in the FIGS. 1 and 3, one of the depicted clamp underparts can be a first clamp underpart and the clamp can further include a second clamp underpart configured to further secure the clamp to an object received by the receptacle when the tightening screw of the second clamp underpart is turned clockwise. In such embodiments, the clamp rail can be configured to: attach to the first clamp underpart at a first end portion of the clamp rail and attach to the second clamp underpart at a second end portion of the clamp rail. The first and second end portions are at opposite ends of the clamp rail as shown in the drawings.

Also, as shown in FIGS. 1 and 3, the clamp base 140 includes a tightening screw 148 configured to secure the pole 102 received by the pole hole 146 when the tightening screw 148 of the body 144 is turned clockwise. As shown, the tightening screw 148 of the body 144 of the clamp base 140 can be a hand knob tightening screw.

In some embodiments, the tightening screw of the clamp underpart (e.g., see tightening screws 136c and 136d) can be a hand knob tightening screw. In some embodiments, a tip of the tightening screw of the clamp underpart can have a flat end and can include rubber to limit the tip from damaging an object that is secured by the tightening screw of the clamp underpart. In some embodiments, a tip of the tightening screw of the clamp underpart has a flat end and can include of felt to limit the tip from damaging an object that is secured by the tightening screw of the clamp underpart.

In some embodiments, a clamp of the system 100 can include one or more gaskets configured to line one or more receiving surfaces of the receptacle 134 to limit the receptacle from damaging an object that it receives (e.g., see gasket 150 and clamp underpart 138 shown in FIG. 3). The one or more gaskets can include rubber, felt, or another soft material.

In some embodiments, a first lateral wall of the two lateral walls can include a perpendicular extension on an end of the first lateral wall opposing the base wall (e.g., see perpendicular extension 152). The perpendicular extension can extend out of the first lateral wall away from the receptacle, such shown by the perpendicular extension 152.

In some embodiments, hand knob tightening screws (e.g., see hand knob tightening screws 136a and 136b) can be used to tighten the clamp 120 and a first lateral wall (e.g., see lateral wall 124) can include corresponding threaded holes to mate the hand knob tightening screws, respectively. In such embodiments, the hand knob tightening screws can be configured to secure the clamp 120 to an object received by the receptacle 134 when the hand knob tightening screws are received by the corresponding threaded holes and turned clockwise. In such examples, tips of the hand knob tightening screws can have flat surfaces and include felt, rubber, or another soft material to limit the tips of the hand knob tightening screws from damaging an object that is secured by the hand knob tightening screws.

In some embodiments, a plate 154 is configured to attach to an underside 156 of the perpendicular extension 152, directly, and an underside 158 of the clamp base 140, indirectly, such that the perpendicular extension 152 is positioned intermediately between the clamp base 140 and the plate 154. In such examples, the clamp underpart may include a gasket that protects a received object from being damaged by the underpart. The object that represents the clamp underpart 138 in FIG. 3 is a gasket. As shown, the clamp underpart 138 is combined with plate 154 and is configured, in combination, to secure the clamp 120 to an object received by the receptacle 134 when the plate 154 is attached to the underside 156 of the perpendicular extension 152 and the underside 158 of the clamp base 140 as well as when the tightening screw of the clamp underpart is tightened by turning it clockwise (e.g., see hand knob tightening screws 136c and 136d).

In some embodiments, a plate of the clamp underpart is configured to attach to an underside of the perpendicular extension, directly, and the clamp underpart is configured to secure the clamp to an object received by the receptacle when the plate is attached to the underside of the perpendicular extension as well as when the tightening screw of the clamp underpart is tightened by turning it clockwise. For example, see the optional arrangement 802 of the clamp 120 shown in FIGS. 8 and 9, which includes an L-shaped interface plate 804 for attaching the clamp base 140 to the rail 122. As shown, a plate 804 can be an intermediate part to the base 140 and the rail 122 and is configured to physically connect the two parts.

As shown in the figures, the receptacle 134 is a U-shaped receptacle in that a cross-section of the receptacle is similar to a shape of the letter U. However, it is to be understood that the receptable could be other shapes in different embodiments, such as C-shaped, H-shaped, or V-shaped. Also, shown in the figures, the pole holes of the bodies are cylindrical holes. However, it is to be understood that the pole holes could be square or rectangular, for example, or another shape for receiving a pole.

Figure 5:
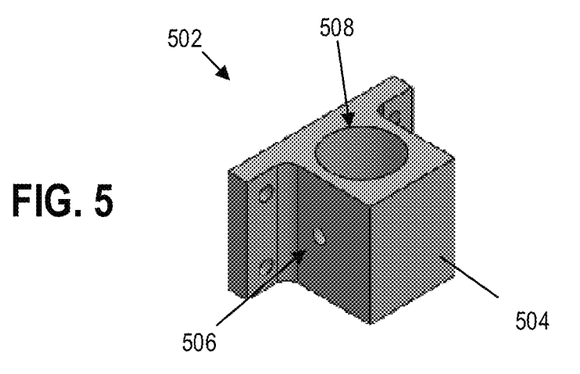
FIG. 5 illustrates a perspective view of a clamp base, in accordance with some embodiments of the present disclosure.

FIG. 5. depicts one example embodiment of a clamp base 502 for the clamp 120. As shown in FIG. 5, the body 504 of the clamp base 502 includes a pin hole 506 perpendicular to its pole hole 508. The pin hole 506 can be positioned to align with a pin hole of a pole received by the pole hole 508 so that the alignment of the pin holes provides a channel through the pin holes for a pin to be inserted into the pin holes to secure the pole to the clamp base 502.

Figure 6:
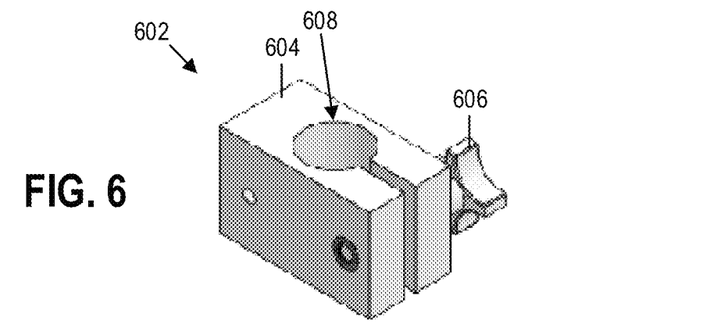
FIGS. 6 and 7 illustrate a perspective view and a partially exploded view, respectively, of another example clamp base, in accordance with some embodiments of the present disclosure.
Figure 7:
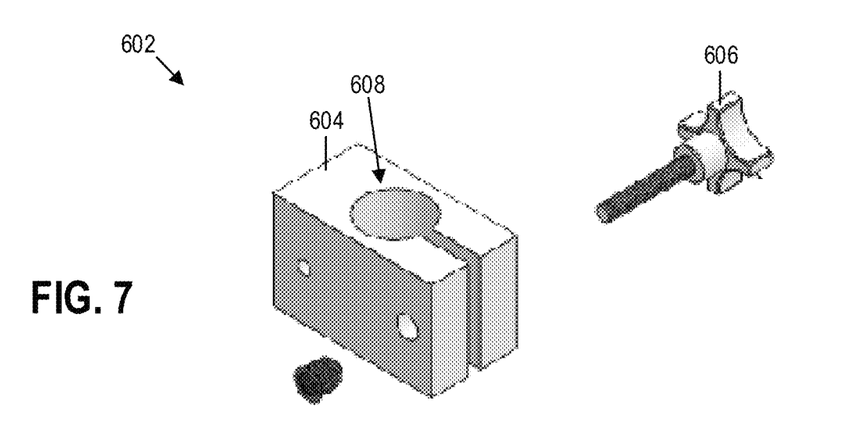

FIGS. 6 and 7 depict one example embodiment of a clamp base 602 for the clamp 120. As shown in FIGS. 6 and 7, the body 604 of the clamp base 602 includes a hand knob tightening screw 606 that can be inserted and screwed into the base 602 perpendicular to a pole hole 608 of the base 602. The tightening screw 606 is configured to secure a pole received by the pole hole 608 of the body 604 when the tightening screw 606 is turned clockwise. In some embodiments, the bases (e.g., see bases 106, 140, 502 and 602) are interchangeable in the system (e.g., see system 100).

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A clamp, comprising:
    a clamp rail, comprising two lateral walls extending out from opposing long ends of a base wall to form a receptacle, wherein the two lateral walls are parallel to each other and the base wall is perpendicular to the two lateral walls;
    a clamp base, comprising:
        an interface wall that is configured to attach to one of the lateral walls or the base wall; and
        a body, comprising a pole hole configured to receive a pole; and
    a clamp underpart configured to secure the clamp to an object received by the receptacle when a tightening screw of the clamp underpart is turned clockwise.

2. The clamp of claim 1, wherein the clamp base comprises a tightening screw configured to secure the pole received by the pole hole when the tightening screw of the body is turned clockwise, and wherein the tightening screw of the body of the clamp base is a hand knob tightening screw.

3. The clamp of claim 1, wherein the body of the clamp base comprises a pin hole perpendicular to the pole hole, and wherein the pin hole is positioned to align with a pin hole of a pole received by the pole hole so that an alignment of the pin holes provides a channel through the pin holes for a pin to be inserted into the pin holes to secure the pole to the clamp base.

4. The clamp of claim 1, wherein the tightening screw of the clamp underpart is a hand knob tightening screw.

5. The clamp of claim 1, wherein a tip of the tightening screw of the clamp underpart has a flat end and comprises rubber to limit the tip from damaging an object that is secured by the tightening screw of the clamp underpart.

6. The clamp of claim 1, wherein a tip of the tightening screw of the clamp underpart has a flat end and comprises of felt to limit the tip from damaging an object that is secured by the tightening screw of the clamp underpart.

7. The clamp of claim 1, comprising one or more gaskets configured to line one or more receiving surfaces of the receptacle to limit the receptacle from damaging an object that it receives.

8. The clamp of claim 7, wherein the one or more gaskets comprise rubber.

9. The clamp of claim 7, wherein the one or more gaskets comprise felt.

10. The clamp of claim 1, wherein a first lateral wall of the two lateral walls comprises a perpendicular extension on an end of the first lateral wall opposing the base wall, and wherein the perpendicular extension extends out of the first lateral wall away from the receptacle.

11. The clamp of claim 10, further comprising hand knob tightening screws, wherein the first lateral wall comprises corresponding threaded holes to mate the hand knob tightening screws, respectively, and wherein the hand knob tightening screws are configured to secure the clamp to an object received by the receptacle when the hand knob tightening screws are received by the corresponding threaded holes and turned clockwise.

12. The clamp of claim 11, wherein tips of the hand knob tightening screws have flat surfaces and comprise felt or rubber to limit the tips of the hand knob tightening screws from damaging an object that is secured by the hand knob tightening screws.

13. The clamp of claim 10, wherein a plate of the clamp underpart is configured to attach to an underside of the perpendicular extension, directly, and an underside of the clamp base, indirectly, such that the perpendicular extension is positioned intermediately between the clamp base and the plate of the clamp underpart, and wherein the clamp underpart is configured to secure the clamp to an object received by the receptacle when the plate is attached to the underside of the perpendicular extension and the underside of the clamp base as well as when the tightening screw of the clamp underpart is tightened by turning it clockwise.

14. The clamp of claim 10, wherein a plate of the clamp underpart is configured to attach to an underside of the perpendicular extension, directly, and wherein the clamp underpart is configured to secure the clamp to an object received by the receptacle when the plate is attached to the underside of the perpendicular extension as well as when the tightening screw of the clamp underpart is tightened by turning it clockwise.

15. The clamp of claim 1, wherein the receptacle is a U-shaped receptacle in that a cross-section of the receptacle is similar to a shape of the letter U.

16. The clamp of claim 1, wherein the pole hole of the body is a cylindrical hole.

17. The clamp of claim 1, wherein the clamp underpart is a first clamp underpart and the clamp further comprises a second clamp underpart configured to further secure the clamp to an object received by the receptacle when the tightening screw of the second clamp underpart is turned clockwise.

18. The clamp of claim 17, wherein the clamp rail is configured to:
attach to the first clamp underpart at a first end portion of the clamp rail; and
attach to the second clamp underpart at a second end portion of the clamp rail, wherein the first and second end portions are at opposite ends of the clamp rail.

19. A clamp, comprising:
a clamp rail, comprising two lateral walls extending out from opposing long ends of a base wall to form a receptacle, wherein the two lateral walls are parallel to each other and the base wall is perpendicular to the two lateral walls;
a clamp base, comprising:
an interface wall that is configured to attach to one of the lateral walls or the base wall; and
a body, comprising a pole hole configured to receive a pole; and
hand knob tightening screws configured to secure the clamp to an object received by the receptacle when the hand knob tightening screws are received by corresponding threaded holes in one or more of the walls of the clamp rail and turned clockwise.

20. A system for mounting a flat panel monitor, television, or other type of display, comprising:
a pole;
a display mounting plate;
a plate base attachable to the display mounting plate, comprising:
a body comprising a pole hole configured to receive the pole; and
a tightening screw configured to secure the pole received by the pole hole of the body of the plate base when the tightening screw of the plate base is turned clockwise; and
a clamp, comprising:
a clamp rail, comprising two lateral walls extending out from opposing long ends of a base wall to form a receptacle, wherein the two lateral walls are parallel to each other and the base wall is perpendicular to the two lateral walls;
a clamp base, comprising:
an interface wall that is configured to attach to one of the lateral walls or the base wall; and
a body, comprising a pole hole configured to receive the pole; and
hand knob tightening screws configured to secure the clamp to an object received by the receptacle when the hand knob tightening screws are received by corresponding threaded holes of the clamp and turned clockwise.

\* \* \* \* \*